US009666079B2

(12) United States Patent
Lokesh

(10) Patent No.: US 9,666,079 B2
(45) Date of Patent: May 30, 2017

(54) SYSTEMS AND METHODS FOR DRIVER ASSISTANCE

(71) Applicant: Harman International Industries, Incorporated, Stamford, CT (US)

(72) Inventor: Chethan Lokesh, Bangalore (IN)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 14/831,770

(22) Filed: Aug. 20, 2015

(65) Prior Publication Data
US 2017/0053534 A1    Feb. 23, 2017

(51) Int. Cl.
*G08G 1/00*    (2006.01)
*B60W 30/165*   (2012.01)
*G07C 5/00*     (2006.01)
*G05D 1/00*     (2006.01)
*H04L 29/08*    (2006.01)

(52) U.S. Cl.
CPC ............. *G08G 1/22* (2013.01); *B60W 30/165* (2013.01); *G05D 1/0016* (2013.01); *G07C 5/008* (2013.01); *H04L 67/12* (2013.01)

(58) Field of Classification Search
CPC ..... G08G 1/22; B60W 30/165; G05D 1/0016; G07C 5/008; H04L 67/12
USPC .......................................................... 701/2
See application file for complete search history.

(56) References Cited

U.S. PATENT DOCUMENTS

| 8,483,928 | B2* | 7/2013 | Shida | B60W 30/165 |
|---|---|---|---|---|
|  |  |  |  | 701/96 |
| 8,744,661 | B2* | 6/2014 | Horn | B60W 30/16 |
|  |  |  |  | 340/435 |
| 8,818,681 | B1* | 8/2014 | Dolgov | G05D 1/0055 |
|  |  |  |  | 180/167 |
| 8,880,273 | B1* | 11/2014 | Chatham | G06K 9/00798 |
|  |  |  |  | 701/23 |

(Continued)

FOREIGN PATENT DOCUMENTS

| DE | 102008061303 A1 | 6/2009 |
|---|---|---|
| EP | 2461303 A1 | 6/2012 |
| EP | 2738751 A1 | 6/2014 |

OTHER PUBLICATIONS

European Patent Office, Partial European Search Report Issued in Application No. 16180685.6, Feb. 6, 2017, Germany, 8 pages.

*Primary Examiner* — Atul Trivedi
(74) *Attorney, Agent, or Firm* — McCoy Russell LLP

(57) ABSTRACT

Embodiments are disclosed for an example vehicle-to-vehicle communication system. The example vehicle-to-vehicle communication system includes a user input interface configured to receive a user input, an inter-vehicle communication system capable of communicating with a navigation system of a second vehicle, a processor, and a storage device storing instructions executable by the processor to receive a first separation from the user of the first vehicle, the first separation being input via the user input interface. Responsive to receiving a first separation from the user of the first vehicle, instructions are further executable to determine a space cushion between the second and first vehicles, the space cushion being determined based on one more of the first separation and a second separation communicated from the second vehicle via the inter-vehicle communication (Continued)

system, and adjust a distance between the first and second vehicles based on the space cushion.

20 Claims, 9 Drawing Sheets

(56) References Cited

U.S. PATENT DOCUMENTS

| | | | | |
|---|---|---|---|---|
| 8,880,319 B2* | 11/2014 | Tsuruta | | B60W 30/165 701/70 |
| 8,954,256 B2* | 2/2015 | Isaji | | B60W 30/16 123/349 |
| 9,189,961 B2* | 11/2015 | Mehr | | B60W 30/165 |
| 2006/0149475 A1* | 7/2006 | Kellum | | G01S 11/06 701/300 |
| 2007/0027583 A1* | 2/2007 | Tamir | | G06Q 30/0283 701/1 |
| 2007/0083318 A1* | 4/2007 | Parikh | | B60W 10/06 701/96 |
| 2007/0159311 A1* | 7/2007 | Schober | | B60Q 1/525 340/435 |
| 2010/0019880 A1* | 1/2010 | Huang | | G07C 5/085 340/5.1 |
| 2010/0019964 A1* | 1/2010 | Huang | | G01M 17/06 342/357.31 |
| 2010/0023180 A1* | 1/2010 | Huang | | B60W 30/12 701/1 |
| 2010/0023181 A1* | 1/2010 | Huang | | B60W 30/12 701/1 |
| 2010/0023182 A1* | 1/2010 | Huang | | B60W 30/12 701/1 |
| 2010/0023183 A1* | 1/2010 | Huang | | B60W 30/12 701/1 |
| 2010/0023196 A1* | 1/2010 | Huang | | G05B 13/0285 701/31.4 |
| 2010/0023197 A1* | 1/2010 | Huang | | B60W 40/09 701/31.4 |
| 2010/0023216 A1* | 1/2010 | Huang | | B62D 6/007 701/42 |
| 2010/0023245 A1* | 1/2010 | Huang | | B60W 30/12 701/117 |
| 2010/0023265 A1* | 1/2010 | Huang | | B60W 40/06 702/1 |
| 2010/0023296 A1* | 1/2010 | Huang | | B60W 40/09 702/141 |
| 2010/0152950 A1* | 6/2010 | Chin | | B60W 40/09 701/31.4 |
| 2010/0152951 A1* | 6/2010 | Chin | | B60W 40/09 701/31.4 |
| 2010/0209881 A1* | 8/2010 | Lin | | G09B 19/167 434/65 |
| 2010/0209882 A1* | 8/2010 | Lin | | G09B 19/167 434/65 |
| 2010/0209884 A1* | 8/2010 | Lin | | G09B 19/167 434/65 |
| 2010/0209886 A1* | 8/2010 | Lin | | G09B 19/167 434/65 |
| 2010/0209892 A1* | 8/2010 | Lin | | G09B 19/167 434/71 |
| 2012/0226411 A1* | 9/2012 | Kuoch | | B60Q 1/085 701/36 |
| 2013/0041576 A1* | 2/2013 | Switkes | | G08G 1/166 701/123 |
| 2013/0187771 A1* | 7/2013 | Rothschild | | G08G 1/096716 340/435 |
| 2013/0226408 A1* | 8/2013 | Fung | | B60W 40/09 701/41 |
| 2013/0231829 A1* | 9/2013 | Gerdt | | G05D 1/0061 701/41 |
| 2014/0091710 A1* | 4/2014 | Ehlgen | | B60Q 1/143 315/82 |
| 2014/0113619 A1* | 4/2014 | Tibbitts | | G07C 5/008 455/419 |
| 2014/0197967 A1* | 7/2014 | Modica | | G08G 1/09 340/932 |
| 2015/0000415 A1* | 1/2015 | Kelley | | B61L 5/12 73/649 |
| 2015/0112504 A1* | 4/2015 | Binion | | G06Q 40/08 701/1 |
| 2015/0112543 A1* | 4/2015 | Binion | | G08G 1/166 701/32.2 |
| 2015/0112731 A1* | 4/2015 | Binion | | G06Q 40/08 705/4 |
| 2016/0311423 A1* | 10/2016 | Storm | | G06Q 50/30 |
| 2016/0318490 A1* | 11/2016 | Ben Shalom | | B60T 7/12 |

* cited by examiner

SYSTEMS AND METHODS FOR DRIVER ASSISTANCE

FIELD

The disclosure relates to the field of driver assistance systems, and in particular to driver assistance systems operable to perform automatic following of a leading vehicle.

BACKGROUND

Driver assistance may include any relief that is provided to a driver during driving that may enhance driver experience, with the aim of increasing driver safety and road safety. Driver assistance systems may be developed to assist the driver in controlling the vehicle. These systems are designed such that when the driver desires for a break or rest from driving, these systems engage full or partial control of the vehicle, thereby reducing risks and fatalities that may arise due to driver fatigue, for example. Furthermore, the driver assistance systems may assume automatic control of the vehicle, with minimal to no driver intervention offering some respite to the driver. This respite, even if it is for short periods of time, may aid in the driver getting some much needed rest, and thus enabling the driver to focus better on driving when the driver resumes manual control of the vehicle.

SUMMARY

Embodiments are disclosed for an example vehicle-to-vehicle communication system two or more vehicles. The system of a first vehicle comprises a user input interface configured to receive an input from a user, and an inter-vehicle communication system capable of communicating with a navigation system of a second vehicle. The vehicle-to-vehicle communication system also includes a processor, and a storage device storing instructions executable by the processor to receive a first separation from the user of the first vehicle, the first separation being input via the user input interface, and responsive to receiving a first separation from the user of the first vehicle, determine a space cushion between the second vehicle and the first vehicle, the space cushion being determined based on one more of the first separation and a second separation communicated from the second vehicle via the inter-vehicle communication system, and adjust a distance between the first vehicle and the second vehicle based on the space cushion.

Embodiments are also disclosed for an example navigation system for a vehicle. The example navigation system includes a sensor system communicatively coupled to cameras mounted on the vehicle and an inter-vehicle communication system configured to receive and transmit information from the vehicle to a leading vehicle. The navigation system also includes a processor and a storage device storing user preferences and storing instructions executable by the processor to responsive to determining the vehicle to be a trailing vehicle, the trailing vehicle being positioned immediately behind the leading vehicle with no vehicle there between, retrieving a desired separation at which to follow the leading vehicle, determine a space cushion based on one or more of the desired separation and other parameters, and follow the leading vehicle at a final distance, the final distance being the space cushion.

Methods for a navigation system of a leading vehicle are also disclosed. An example method includes receiving, from a trailing vehicle, a request to automatically follow the vehicle and responsive to receiving the request, retrieve a preferred leading distance from a storage device of a navigation system and selectively adjust the preferred leading distance based upon one or more vehicle and/or environmental conditions.

BRIEF DESCRIPTION OF THE DRAWINGS

The disclosure may be better understood from reading the following description of non-limiting embodiments, with reference to the attached drawings, wherein below.

DETAILED DESCRIPTION

As described above, driver assistance solutions offer some respite to drivers, by taking automatic control of the vehicle. The present disclosure describes a navigation system that establishes communication between a leading vehicle and a trailing vehicle. The communication includes one or more of a desire to follow the leading vehicle, a distance for which to follow, a speed at which to follow, and a separation or space cushion between the vehicles. In examples where the driver of a trailing vehicle desires to follow a leading vehicle, the driver assistance system of the trailing vehicle takes automatic control of the trailing vehicle and follows the leading at the separation estimated based on various factors, including but not limited to inputs from drivers of both the vehicles, environmental conditions, road conditions, vehicle conditions, etc. Example embodiments are provided where the driver assistance system may further assist the driver by establishing vehicle-to-vehicle communication between the leading vehicle and the trailing vehicle to communicate about any emergency ahead and/or other information, thus improving vehicle and road safety.

Figure 1:
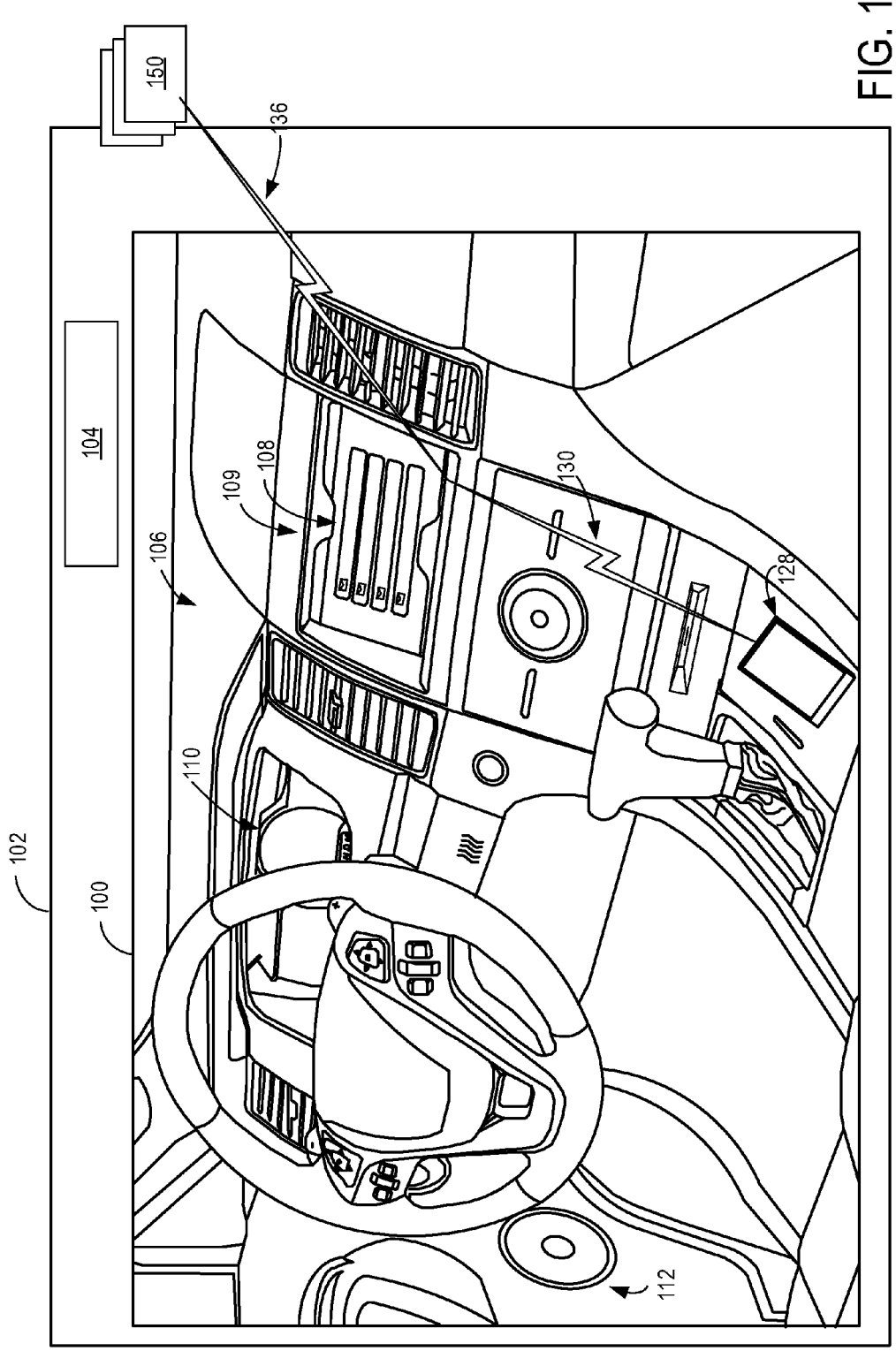
FIG. 1 shows an example partial view of a vehicle cabin in accordance with one or more embodiments of the present disclosure.

FIG. 1 shows an example partial view of one type of environment for a driver assistance system: an interior of a cabin 100 of a vehicle 102, in which a driver and/or one or more passengers may be seated. Vehicle 102 of FIG. 1 may be a motor vehicle including drive wheels (not shown) and an internal combustion engine 104. Vehicle 102 may be a leading vehicle or a trailing vehicle. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

The cabin 100 may include one or more sensors for monitoring the vehicle, the user, and/or the environment. For example, the cabin 100 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct telephone calls, and/or to measure ambient noise in the cabin 100, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as sensors coupled to external devices 150 and/or mobile device 128.

Cabin 100 may also include one or more user objects, such as mobile device 128, that are stored in the vehicle before, during, and/or after travelling. The mobile device 128 may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], Ethernet, etc.) or wireless (e.g., via BLUETOOTH, WIFI, WIFI direct Near-Field Communication [NFC], cellular connectivity, etc.) and configured to provide two-way communication between the mobile device and the in-vehicle computing system. The mobile device 128 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

In-vehicle computing system 109 may also be communicatively coupled to additional devices operated and/or accessed by the user but located external to vehicle 102, such as one or more external devices 150. In the depicted embodiment, external devices are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smartwatch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150. In some embodiments, the external devices 150 may include in-vehicle computing devices of another vehicle, as such the vehicle may be a vehicle leading the vehicle 102, or may be a vehicle trailing behind vehicle 102.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

Figure 2:
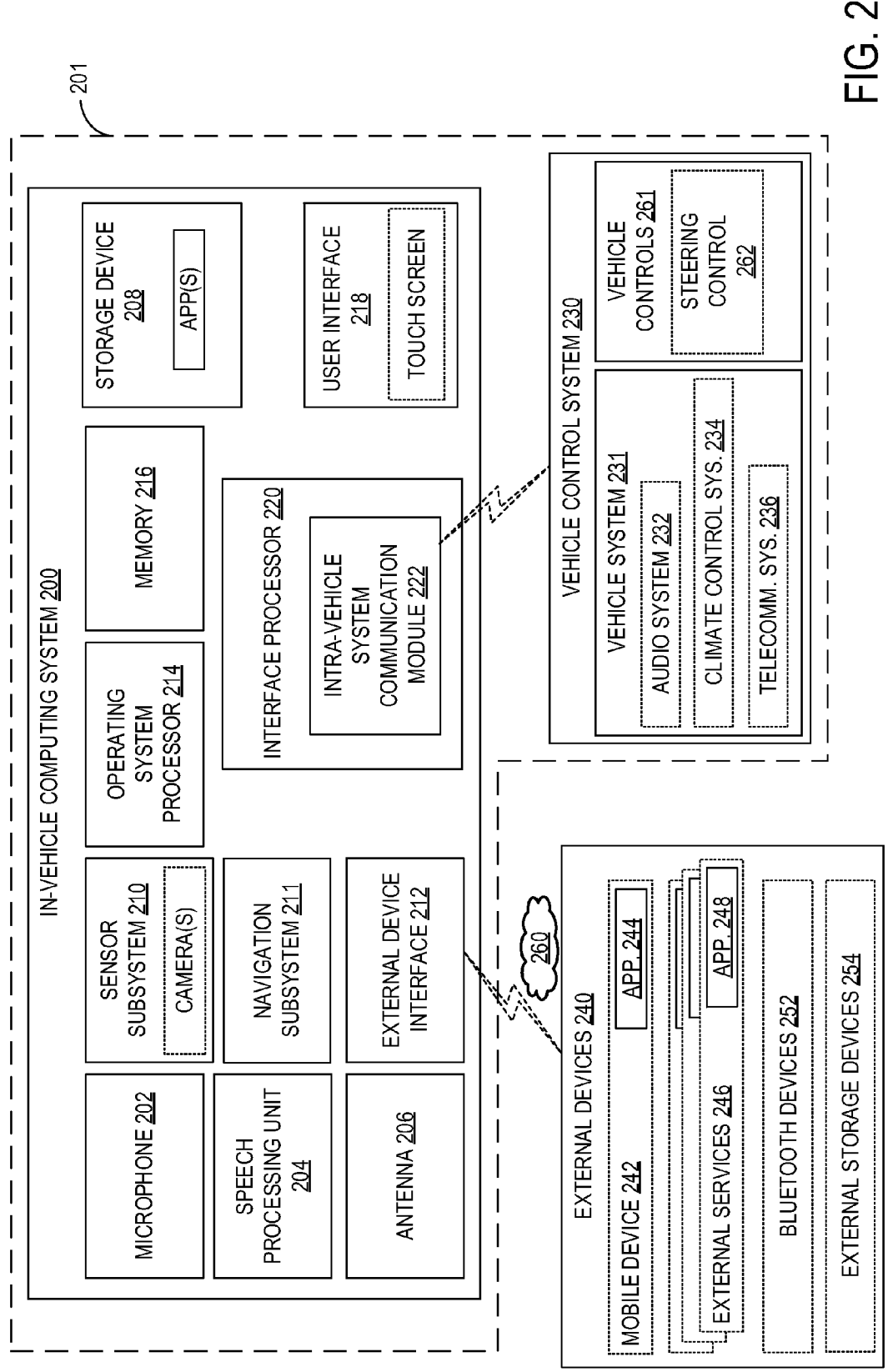
FIG. 2 shows an example in-vehicle computing system in accordance with one or more embodiments of the present disclosure.

FIG. 2 shows a block diagram of an in-vehicle computing system 200 configured and/or integrated inside vehicle 201. In-vehicle computing system 200 may be an example of in-vehicle computing system 109 of FIG. 1 and/or may perform one or more of the methods described herein in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 201 in order to enhance an in-vehicle experience for a driver and/or a passenger.

In-vehicle computing system 200 may include one or more processors including an operating system processor 214 and an interface processor 220. Operating system processor 214 may execute an operating system on the in-vehicle computing system, and control input/output, display, playback, and other operations of the in-vehicle computing system. Interface processor 220 may interface with a vehicle control system 230 via an intra-vehicle system communication module 222.

Intra-vehicle system communication module 222 may output data to other vehicle systems 231 and vehicle control elements 261, while also receiving data input from other vehicle components and systems 231, 261, e.g. by way of vehicle control system 230. When outputting data, intra-vehicle system communication module 222 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine related information may be communicated, a climate control CAN bus through which climate control related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 208 may be included in in-vehicle computing system 200 to store data such as instructions executable by processors 214 and 220 in non-volatile form. The storage device 208 may store application data to enable the in-vehicle computing system 200 to run an application for connecting to a cloud-based server and/or collecting information for transmission to the cloud-based server. The application may retrieve information gathered by vehicle systems/sensors, input devices (e.g., user interface 218), devices in communication with the in-vehicle computing system (e.g., a mobile device connected via a Bluetooth link), etc. In-vehicle computing system 200 may further include a volatile memory 216. Volatile memory 216 may be random access memory (RAM). Non-transitory storage devices, such as non-volatile storage device 208 and/or volatile memory 216, may store instructions and/or code that, when executed by a processor (e.g., operating system processor 214 and/or interface processor 220), controls the in-vehicle computing system 200 to perform one or more of the actions described in the disclosure.

A microphone 202 may be included in the in-vehicle computing system 200 to receive voice commands from a user, to measure ambient noise in the vehicle, to determine whether audio from speakers of the vehicle is tuned in accordance with an acoustic environment of the vehicle, etc. A speech processing unit 204 may process voice commands, such as the voice commands received from the microphone 202. In some embodiments, in-vehicle computing system 200 may also be able to receive voice commands and sample ambient vehicle noise using a microphone included in an audio system 232 of the vehicle.

One or more additional sensors may be included in a sensor subsystem 210 of the in-vehicle computing system 200. For example, the sensor subsystem 210 may include a camera, such as a rear view camera for assisting a user in parking the vehicle and/or a cabin camera for identifying a user (e.g., using facial recognition and/or user gestures). Sensor subsystem 210 of in-vehicle computing system 200 may communicate with and receive inputs from various vehicle sensors and may further receive user inputs. For example, the inputs received by sensor subsystem 210 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 210 alone, other sensors may communicate with both sensor subsystem 210 and vehicle control system 230, or may communicate with sensor subsystem 210 indirectly via vehicle control system 230. A navigation subsystem 211 of in-vehicle computing system 200 may generate and/or receive navigation information such as location information (e.g., via a GPS sensor and/or other sensors from sensor subsystem 210), route guidance, traffic information, point-of-interest (POI) identification, and/or provide other navigational services for the driver.

External device interface 212 of in-vehicle computing system 200 may be coupleable to and/or communicate with one or more external devices 240 located external to vehicle 201. While the external devices are illustrated as being located external to vehicle 201, it is to be understood that they may be temporarily housed in vehicle 201, such as when the user is operating the external devices while operating vehicle 201. In other words, the external devices 240 are not integral to vehicle 201. The external devices 240 may include a mobile device 242 (e.g., connected via a Bluetooth, NFC, WIFI direct, or other wireless connection) or an alternate Bluetooth-enabled device 252. Mobile device 242 may be a mobile phone, smart phone, wearable devices/sensors that may communicate with the in-vehicle computing system via wired and/or wireless communication, or other portable electronic device(s). Other external devices include external services 246. For example, the external devices may include extra-vehicular devices that are separate from and located externally to the vehicle. Still other external devices include external storage devices 254, such as solid-state drives, pen drives, USB drives, etc. External devices 240 may communicate with in-vehicle computing system 200 either wirelessly or via connectors without departing from the scope of this disclosure. For example, external devices 240 may communicate with in-vehicle computing system 200 through the external device interface 212 over network 260, a universal serial bus (USB) connection, a direct wired connection, a direct wireless connection, and/or other communication link.

The external device interface 212 may provide a communication interface to enable the in-vehicle computing system to communicate with mobile devices associated with contacts of the driver. For example, the external device interface 212 may enable phone calls to be established and/or text messages (e.g., SMS, MMS, etc.) to be sent (e.g., via a cellular communications network) to a mobile device associated with a contact of the driver. The external device interface 212 may additionally or alternatively provide a wireless communication interface to enable the in-vehicle computing system to synchronize data with one or more devices in the vehicle (e.g., the driver's mobile device) via WIFI direct, as described in more detail below.

One or more applications 244 may be operable on mobile device 242. As an example, mobile device application 244 may be operated to aggregate user data regarding interactions of the user with the mobile device. For example, mobile device application 244 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 244 to external device interface 212 over network 260. In addition, specific user data requests may be received at mobile device 242 from in-vehicle computing system 200 via the external device interface 212. The specific data requests may include requests for determining where the user is geographically located, an ambient noise level and/or music genre at the user's location, an ambient weather condition (temperature, humidity, etc.) at the user's location, etc. Mobile device application 244 may send control instructions to components (e.g., microphone, etc.) or other applications (e.g., navigational applications) of mobile device 242 to enable the requested data to be collected on the mobile device. Mobile device application 244 may then relay the collected information back to in-vehicle computing system 200.

Likewise, one or more applications 248 may be operable on external services 246. As an example, external services applications 248 may be operated to aggregate and/or analyze data from multiple data sources. For example, external services applications 248 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context (e.g., requesting/sending data to other devices).

Vehicle control system 230 may include controls for controlling aspects of various vehicle systems 231 involved in different in-vehicle functions. These may include, for example, controlling aspects of vehicle audio system 232 for providing audio entertainment to the vehicle occupants, aspects of climate control system 234 for meeting the cabin cooling or heating needs of the vehicle occupants, as well as aspects of telecommunication system 236 for enabling vehicle occupants to establish telecommunication linkage with others.

Audio system 232 may include one or more acoustic reproduction devices including electromagnetic transducers such as speakers. Vehicle audio system 232 may be passive or active such as by including a power amplifier. In some examples, in-vehicle computing system 200 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 234 may be configured to provide a comfortable environment within the cabin or passenger compartment of vehicle 201. Climate control system 234 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 230 may also include controls for adjusting the settings of various vehicle controls 261 (or vehicle system control elements) related to the engine and/or auxiliary elements within a cabin of the vehicle, such as steering wheel controls 262 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. Vehicle controls 261 may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system. The control signals may also control audio output at one or more speakers of the vehicle's audio system 232. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 234. For example, the control signals may increase delivery of cooled air to a specific section of the cabin.

Control elements positioned on an outside of a vehicle (e.g., controls for a security system) may also be connected to computing system 200, such as via communication module 222. The control elements of the vehicle control system may be physically and permanently positioned on and/or in the vehicle for receiving user input. In addition to receiving control instructions from in-vehicle computing system 200, vehicle control system 230 may also receive input from one or more external devices 240 operated by the user, such as from mobile device 242. This allows aspects of vehicle systems 231 and vehicle controls 261 to be controlled based on user input received from the external devices 240.

In-vehicle computing system 200 may further include an antenna 206. Antenna 206 is shown as a single antenna, but may comprise one or more antennas in some embodiments. The in-vehicle computing system may obtain broadband wireless internet access via antenna 206, and may further receive broadcast signals such as radio, television, weather, traffic, and the like. The in-vehicle computing system may receive positioning signals such as GPS signals via one or more antennas 206. The in-vehicle computing system may also receive wireless commands via RF such as via antenna(s) 206 or via infrared or other means through appropriate receiving devices. In some embodiments, antenna 206 may be included as part of audio system 232 or telecommunication system 236. Additionally, antenna 206 may provide AM/FM radio signals to external devices 240 (such as to mobile device 242) via external device interface 212.

One or more elements of the in-vehicle computing system 200 may be controlled by a user via user interface 218. User interface 218 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 200 and mobile device 242 via user interface 218. In addition to receiving a user's vehicle setting preferences on user interface 218, vehicle settings selected by in-vehicle control system may be displayed to a user on user interface 218. Notifications and other messages (e.g., received messages), as well as navigational assistance, may be displayed to the user on a display of the user interface. User preferences/information and/or responses to presented messages may be performed via user input to the user interface.

Figure 3:
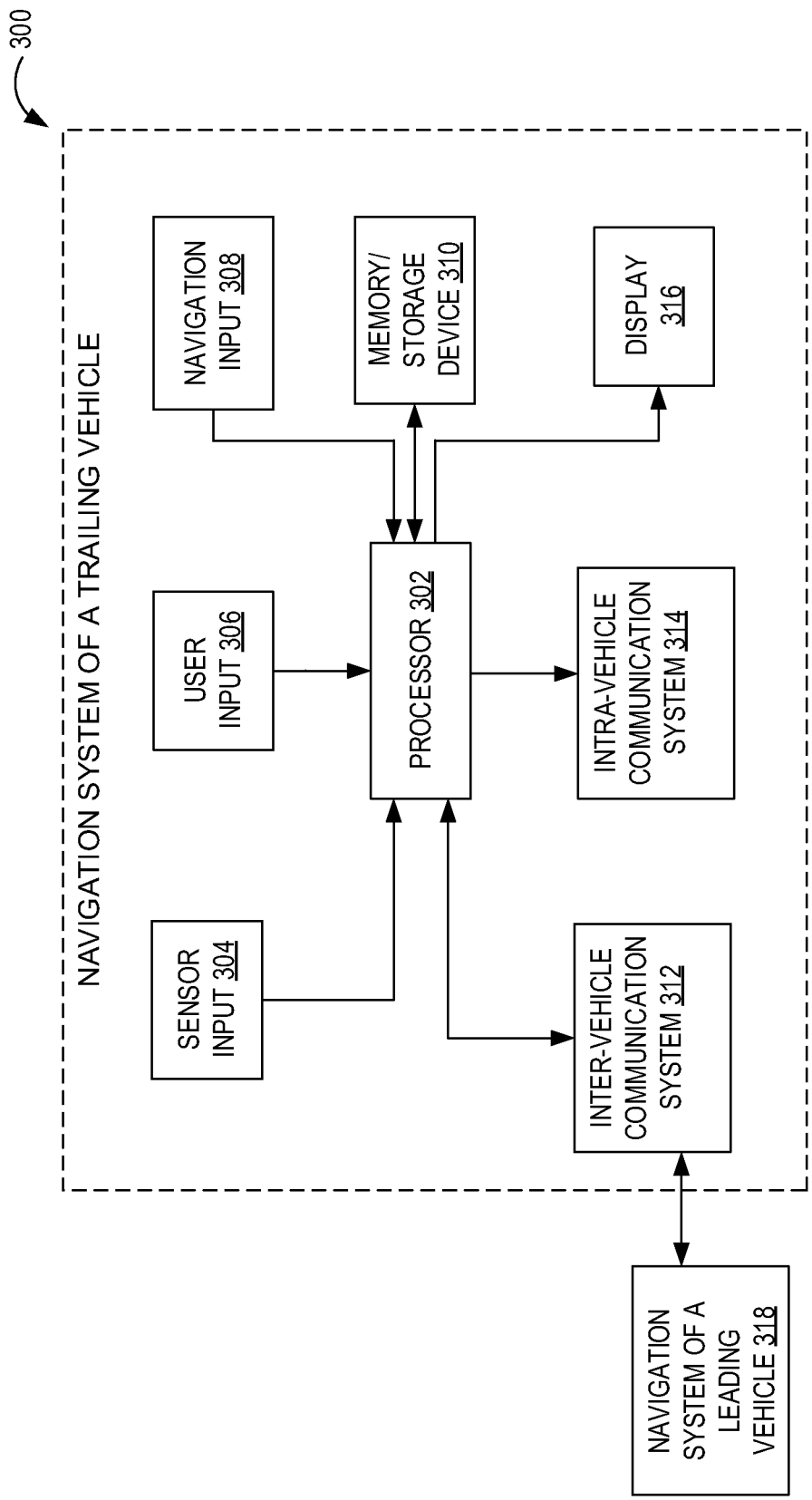
FIG. 3 shows a block diagram of an example navigation system in a trailing vehicle in accordance with one or more embodiments of the present disclosure.

FIG. 3 shows a block diagram of an example navigation system in a trailing vehicle in accordance with one or more embodiments of the present disclosure. For example, the navigation system 300 of the trailing vehicle may communicate with a navigation system of a leading vehicle 318 as described below.

The navigation system 300 includes a processor 302, a memory/storage device 310, a display 316, a sensor input 304, a user input interface 306, a navigation input interface 308, an inter-vehicle communication system 312, and intra-vehicle communication system 314. The navigation system may be configured as a component of a motor vehicle navigation system (e.g., in-vehicle computing system, 109 of FIG. 1/in-vehicle computing system 200 of FIG. 2), as a handheld device, as a component of a smart phone, and/or as any other suitable computing device(s). The processor may be an example of the operating system, processor 214 of FIG. 2, and may further include the interface processor 220 of FIG. 2, and/or may perform one or more methods described herein in some embodiments. The processor 302 may receive a user input via the user input interface 306, which may be a module or port for receiving user input from a user input device connected to the navigation system and/or from a user interface of the navigation system (e.g., a graphical user interface [GUI]). The user (or driver) of a vehicle may input on the display 316 (e.g., a touch-sensitive display), a desire to follow a leading vehicle, for example. The processor 302 may communicate or transmit this information to the navigation system of the leading vehicle 318 via the inter-vehicle communication system 312. Additionally, the inter-vehicle communication system 312 may receive additional information and/or signal(s) from the navigation system of the leading vehicle 318 and transmit it to the processor 302 for additional processing. The processor receives additional inputs from plurality of sensors both mounted on the vehicle, and located external to the vehicle. In some examples, the sensors are cameras. As such, pictures or videos of a region surrounding the vehicle taken by cameras mounted on the vehicle may be received by the processor 302. This input may further be analyzed to decipher information from the received images and/or videos. The processor 302 may additionally retrieve input stored in the memory/storage device 310. For example, the driver may store a preference to automatically follow a leading vehicle when in a no-pass zone. The driver may additionally or alternatively save details on a desired separation (or space cushion) to follow the leading vehicle in the memory/storage device 310 as historical data which may be subsequently retrieved by the processor 302. In some examples, the processor 302 may be capable of adaptively learning to anticipate a driver's desire to follow a leading vehicle based on the historical data stored in the memory/storage device.

For example, no-passing zone ahead signal may be detected by a camera mounted on the vehicle. In such an example, the camera mounted on the vehicle may capture images of two solid yellow line markings on the road, and, based on the images processed by the processor 302, the processor may identify that the vehicle is in a no-pass zone for example. The no-pass zone may also be identified based on road signs (such as "NO PASSING ZONE" or "NO-PASS ZONE" signs or signs having graphical representations of a no passing zone, such as a depiction of two cars in parallel with one another and an "x" through one of the cars) posted along the roads, or additionally and/or alternatively identified based on navigational input 308. Additionally or alternatively, the no-passing zone ahead signal may be deduced based on navigation input from a GPS. For example, based on a current location of the vehicle, the processor may receive locations of no-pass zones along a route that the current vehicle is travelling. The processor 302 may identify upcoming no-pass zones based on such navigational input. Once a no-passing zone or no-passing zone ahead signal is detected, the user or driver of the current vehicle may indicate a desire (e.g., a request) to follow a leading vehicle. As such, the request to automatically follow the leading vehicle may be stored as a user preference in memory/storage device 310, and further retrieved by the processor 302.

Automatic following may include one or more combinations of engaging auto-pilot and/or engaging an automatic vehicle control routine by increasing an amount of control of the vehicle automatically provided by one or more vehicle control systems (such as vehicle control system, 230 of FIG. 2), and decreasing manual control of the vehicle by the driver. As such, the control of the vehicle control systems may be communicated via the intra-vehicle communication system 314 (e.g., intra-vehicle communication module, 222 of FIG. 2). Furthermore, the processor 302 may wait to perform the action of engaging automatic vehicle control routine until a leading vehicle is detected. The leading vehicle may be detected based on sensor input 304 (e.g., based on a camera mounted in the front of the vehicle capturing an image of a vehicle immediately in front of the vehicle, at a threshold distance, for example). Upon detecting the leading vehicle, the request of the driver of the current (trailing) vehicle may be communicated to a navigation system, of the leading vehicle 318, transmitted via one or more or wireless networks and Bluetooth. Further, based on a mutual agreement between the leading and the trailing vehicle on one or more of the distance to follow, and the speed at which to follow, the intra-vehicle processor may transmit signals to the vehicle controls and further engage an automatic vehicle control routine and/or auto-pilot of the vehicle. The automatic vehicle control routine of the vehicle may include automatically adjusting vehicle control systems with minimal/decreased driver intervention/control. The automatic vehicle control routine of the trailing vehicle may further include details of adjusting the vehicle control systems to maintain a threshold speed of the trailing vehicle for a threshold distance at a threshold separation from the leading vehicle as described in FIG. 4.

For example, while operating under the automatic vehicle control routine, one or more vehicle control commands, such as steering, acceleration/speed/braking, gear shifting, and/or other commands may be provided automatically by one or more vehicle systems (e.g., based on instructions from the leading vehicle and/or from a processor of the vehicle). During operation of the automatic vehicle control routine, driver-initiated vehicle control commands (e.g., for the steering, acceleration/speed/braking, gear shifting, etc.) may be ignored, discarded, and/or held for later processing. In this way, the vehicle may not respond to some or all driver-initiated commands (e.g., from a driver of the vehicle to one or more driver control devices, such as a steering wheel, gas/accelerator pedal, brake pedal, parking brake, gear shifter, and/or other device for accepting driver input to control driving operation of the vehicle) during the automatic vehicle control routine. In some examples, the driver may provide an automatic vehicle control override input that enables the system to quickly return at least some controls to the driver. In some examples, the return of the controls may be provided responsive to receiving a threshold number, type, or degree of driver-initiated control inputs during operation under the automatic vehicle control routine (e.g., a request for braking that exceeds a threshold braking request [e.g., a position of the brake pedal being moved to within a threshold distance of the fully-depressed position]). In some examples, some vehicle controls may remain responsive to driver commands even while operating the automatic vehicle control routine. For example, the driver may be able to depress a brake pedal to brake the vehicle even while operating under the automatic vehicle control routine. However, driver input to other vehicle systems (e.g., turning a steering wheel, depressing an accelerator pedal, moving a gear shift) may be ignored by the vehicle and/or otherwise may not be provided as control commands to an associated vehicle system (e.g., an engine, transmission, fuel injector, throttle, etc.). Conversely, during a manual vehicle control routine, all or a majority of the above-described vehicle commands may be provided by the driver and none or a minority of the above-described vehicle commands may be provided automatically by the vehicle, signals from a leading vehicle, and/or a processor of the vehicle.

In some embodiments, the navigation system 300 may further include a passing assistance calculator (not shown). The driver of the trailing vehicle may indicate a request to pass or a request not to pass, and following distance and/or other parameters may be controlled differently depending on the type of request received. If the request is to pass a leading vehicle, then the passing assistance calculator may calculate a distance to overtake based on engine power limits, speed of leading vehicle, distance to leading vehicle, and where in road ahead the passing is no longer allowed (e.g., when the road switches from passing allowed to passing not allowed), and further based on whether there is more than one leading vehicle. The parameters may further be adjusted based on acceleration and/or deceleration of forward vehicle, and based on expected grade of road that the vehicle will traverse during the passing operation. The navigation system 300 may then inform the driver of a recommended overtake velocity that may result in a safe, successful, and timely pass. If the request is to not pass, the following distance and/or other parameters may be maintained at a previously-determined/set level.

Figure 4:
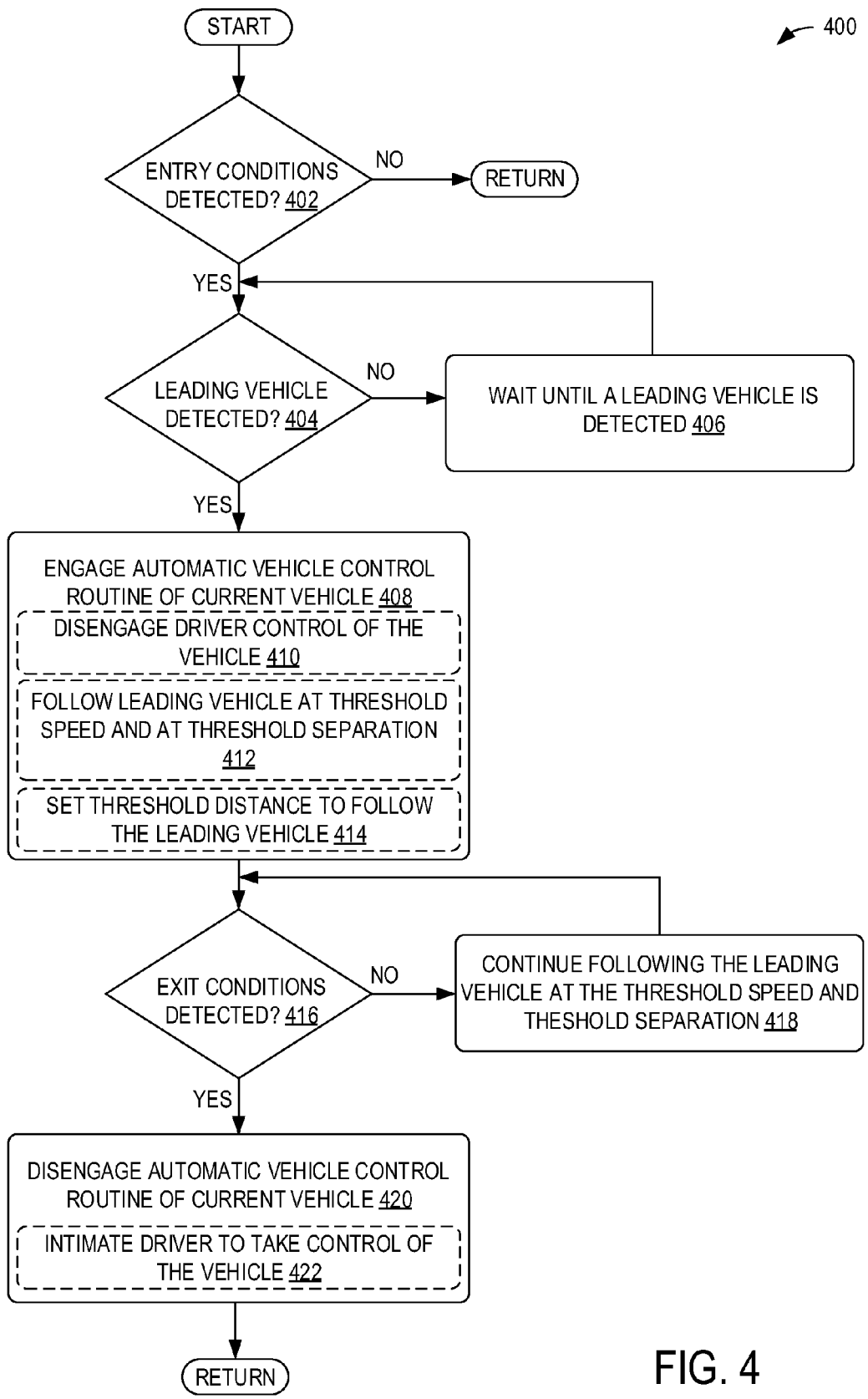
FIG. 4 is a flow chart of an example method for driver assistance with respect to following a leading vehicle in accordance with one or more embodiments of the present disclosure.

FIG. 4 shows an example method 400 for driver assistance with respect to following a leading vehicle in accordance with one or more embodiments of the present disclosure. Specifically, the method includes automatic control of the vehicle when one or more entry conditions are met, and subsequently discontinuing automatic control when one or more exit conditions are met. In some examples, method 400 may be performed by the navigation system 300 illustrated in FIG. 3.

Method 400 begins by checking if entry conditions of a current vehicle are detected at 402. Entry conditions may include, but are not limited to, identifying start of one or more of a no-passing zone, a narrow lane zone, a one-lane zone, a construction/road-work ahead zone, and a slippery zone. The detection may be based on inputs from sensors (such as cameras, GPS, etc.). For example, when the camera mounted on the vehicle detects a "NO-PASS ZONE" sign or detects double yellow line markings on the road or detects "OVERTAKING PROHIBITED" sign, an entry condition may be considered to be detected. In some examples, detecting a narrow-lane sign and/or a one-lane sign may indicate that an entry condition is detected. In some examples, when the driving conditions are difficult as a result of wet/slippery roads, the driver may not be able to safely handle vehicle control, and automatic control of the vehicle may be useful to effectively control the vehicle. As such slippery roads may be detected based on one or more of sensor data, navigation data, and vehicle condition/traction data. In some embodiments, the detection may be based on a driver preference. As such, the driver/user may enter a preference to automatically follow a leading vehicle. As another example, when flashing emergency lights are detected, entry conditions may be considered to be met and automatic control of the vehicle may be initiated as described below.

If entry conditions are not detected at 402, then the method returns (e.g., without initiating an automatic vehicle control routine). However, if entry conditions are detected at 402, then method proceeds to 404 to determine whether a leading vehicle is detected. The leading vehicle may be defined as the vehicle immediately in front of the current vehicle, with no vehicle there between. In other examples, a vehicle may be considered a leading vehicle if that vehicle is at a threshold distance ahead of the current/trailing vehicle. The leading vehicle may be detected by the camera on the current vehicle, for example. However, if leading vehicle is not detected or the vehicle in front of the current vehicle is at a distance greater than the threshold distance, then method proceeds to 406 to wait until a leading vehicle is detected (e.g., to continue polling for the leading vehicle at 404). If a leading vehicle is detected (e.g., a vehicle immediately in front of the current vehicle at a distance lower than the threshold distance), then method proceeds to 408 to send control instructions to the vehicle control systems to engage autopilot and/or an automatic control routine of the current vehicle.

Engaging autopilot and/or automatic control routine of the current vehicle at 408 may include disengaging driver control of the vehicle at 410. Disengaging driver control may include one or more of decreasing an amount of control of the vehicle provided by the driver of the vehicle (also referred to as manual control of the vehicle), and increasing an amount of control of the vehicle automatically provided by one or more vehicle systems at 410 (e.g., without driver intervention). Engaging autopilot and/or automatic vehicle control may additionally or alternatively include automatically following the leading vehicle at a threshold speed and at a threshold separation (also referred to as space cushion) at 412. For example, the threshold speed may be determined based on a speed limit in the stretch of road and further adjusted based on the driving and vehicle conditions and/or user preferences (e.g., as set by the driver of the leading and/or trailing vehicle). As an example, if the speed limit on the stretch of road is 35 mph, then the threshold speed for automatic control of the vehicle may be set to 35 mph. However, the threshold speed may be reduced to a lower number (e.g., 25 mph) if the weather conditions include rain, snow, sleet, etc. In some other examples, the driver (one or more of the driver of the leading vehicle and the driver of the leading vehicle) may input the threshold speed. The threshold speed may further be adjusted based on the type of entry condition detected. For example, in a construction zone, the threshold speed may be adjusted to 5-10 mph lower than the speed limit posted in the zone. Furthermore, at 412, threshold separation or space cushion may be determined. The space cushion is described in detail in FIGS. 7-9. Briefly, the space cushion is the separation between a leading vehicle and a trailing vehicle. The space cushion may be further adjusted based on user driving habit, user driving skill, and/or user distraction level of one or more of a driver of the leading vehicle and a driver of the trailing vehicle. In some examples, the space cushion may be a function of the road signs.

Next, at 414 a threshold distance to follow the leading vehicle may be determined. The threshold distance to follow may be based on one or more of navigation data, vehicle data, user preference, etc. In some examples, the threshold distance may be adjusted based on the type of entry condition detected. In additional or alternative examples, the threshold distance may be determined based on the driver preference. The driver preference may include one or more preferences from the driver of the trailing vehicle and/or the driver of the leading vehicle. In some examples, the threshold distance to follow a leading vehicle may correspond to the distance from a location of the vehicle when the entry condition is detected to a location of the vehicle when an exit condition is detected. For example, the trailing vehicle may automatically follow the leading vehicle until the end of the no-pass zone for example.

After engaging the autopilot/automatic vehicle control routine, the method proceeds to 416, to determine whether exit conditions are detected. Exit conditions may include identifying an end of one or more of the no-passing zone, the narrow lane zone, the one-lane zone, the construction/road work ahead zone, and the slippery road. The driver of one or more of the trailing and the leading vehicle may be able to override the automatic control of the trailing vehicle at any time. For example, if the driver provides a request not to automatically follow the leading vehicle, the exit conditions may be considered to be met. If exit conditions are not detected at 416, then method proceeds to 418, where the current vehicle may be continued to be driven via autopilot, wherein the vehicle may be automatically controlled via an automatic vehicle control routine in which manual control of the vehicle is reduced relative to a standard or manual vehicle control routine, for example. As indicated at 418, the speed and/or trailing distance of the trailing vehicle may be maintained. However, if exit conditions are detected at 416, then method 400 proceeds to 420, where the autopilot may be disengaged (e.g., automatic vehicle control is exited and a manual vehicle control routine is initiated, returning at least some control of the vehicle to the driver) and additionally, the driver may be intimated to take manual control of the vehicle at 422, following which the method returns. Disengaging of autopilot at 420 and intimation of driver at 422 may be performed concurrently or sequentially. In this way, the driver may be relieved from having to negotiate through mundane stretches. By not actively participating in the negotiation, and by not participating in the vehicle control, the driver may be able to get some rest and reduce mental stress. The reduced mental stress may further stave off driver fatigue. Therefore, when the driver returns to actively driving, the driver may be more alert compared to a driver who has had to negotiate through the mundane stretches.

The method 400 is described as executed by the trailing vehicle, wherein the trailing vehicle follows the leading vehicle automatically at the threshold separation during automatic vehicle control. The method 400 may be additionally or alternatively executed in the leading vehicle whereby the leading vehicle may determine the space cushion at which it would like to be followed during automatic vehicle control. The leading vehicle may communicate the preferences to the trailing vehicle and/or the commands to control the vehicle systems of the trailing vehicle to operate the trailing vehicle according to the preferences. It is to be understood that any control signals received from outside the trailing vehicle may be accepted by the driver of the trailing vehicle before being executed. In some examples, methods for selectively entering an automatic vehicle control routine and/or calculating a trailing distance may be executed by one or more of the leading/trailing vehicles to communicate with one or more of immediately leading/trailing vehicles respectively.

Figure 5:
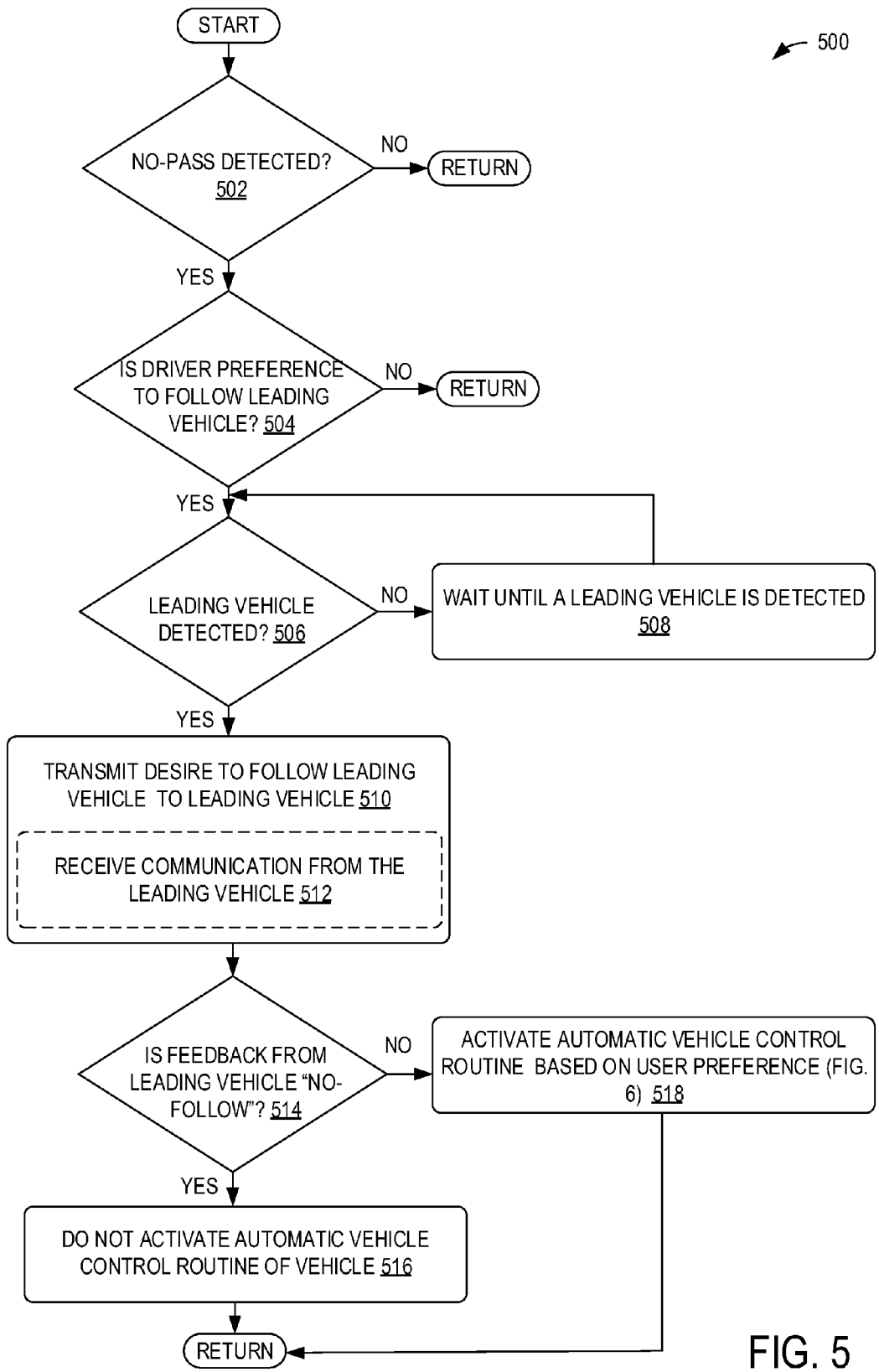
FIG. 5 is a flow chart of an example method for providing driver assistance to a trailing vehicle in a no-pass zone in accordance with one or more embodiments of the present disclosure.

FIG. 5 shows an example method for providing driver assistance to a trailing vehicle in a no-pass zone in accordance with one or more embodiments of the present disclosure. Specifically, the method includes activating autopilot or automatic control of the vehicle based on detecting the no-pass zone. For example, method 500 may be performed by the navigation system 300 illustrated in FIG. 3.

At 502, the method includes determining if a no-pass zone is detected. The no-pass zone may be detected based on the cameras detecting a no-pass signal on the street, for example. In some examples, a no-pass zone may be detected based on double yellow markings on the road as detected by cameras mounted on the front of the vehicle. The no-pass may additionally or alternatively be detected based on navigation input received from the GPS. If a no-pass zone is not detected, then method returns (e.g., to maintain a current level of manual vehicle control and/or without engaging an autopilot and/or automatic vehicle control routine). However, if a no-pass zone is detected, then method proceeds to 504, where a driver preference may be checked. For example, at 504, the processor may determine whether the driver preference is to follow a leading vehicle. As such, when the no-pass zone is detected, the driver may be asked if he/she would like to follow the leading vehicle. If "NO", then method returns. In additional or alternative examples, the driver preference may be learned based on driving record/historical data retrieved from memory. If the driver preference is to follow the leading vehicle, then method 500 proceeds to 506, to determine whether a leading vehicle is detected. The leading vehicle may include the vehicle immediately ahead of the current vehicle, with no vehicle there between. The leading vehicle may further include vehicle at a threshold distance from the current vehicle. The leading vehicle may be detected by cameras mounted on the front of the current vehicle, for example. If there is no leading vehicle detected, then method proceeds to 508, where the method includes instructions to wait until a leading vehicle is detected. Once the leading vehicle is detected, then method proceeds to 510, where the desire/request to follow the leading vehicle by the current vehicle (also referred to as the trailing vehicle), is transmitted to the leading vehicle. Next, at 512, the trailing vehicle receives communication from the leading vehicle. If the communication received (or feedback from the leading vehicle) is "NO-FOLLOW" and/or otherwise indicates that the trailing vehicle is not permitted to follow the leading vehicle, then the method proceeds to 516, wherein the autopilot or automatic vehicle control routine is not activated. However, if the feedback from the leading vehicle is not "NO-FOLLOW" or in other words is "FOLLOW" or otherwise indicates that the trailing vehicle is permitted to follow the leading vehicle, then the method proceeds to 518 where autopilot or automatic vehicle control routine of the trailing vehicle is activated as described in FIG. 6. However if there is no feedback from leading vehicle, then the trailing vehicle may operate as though a permission to follow was received, and automatically follow the leading vehicle as described at 518 until "NO-FOLLOW" is received or another exit condition is met.

Figure 6:
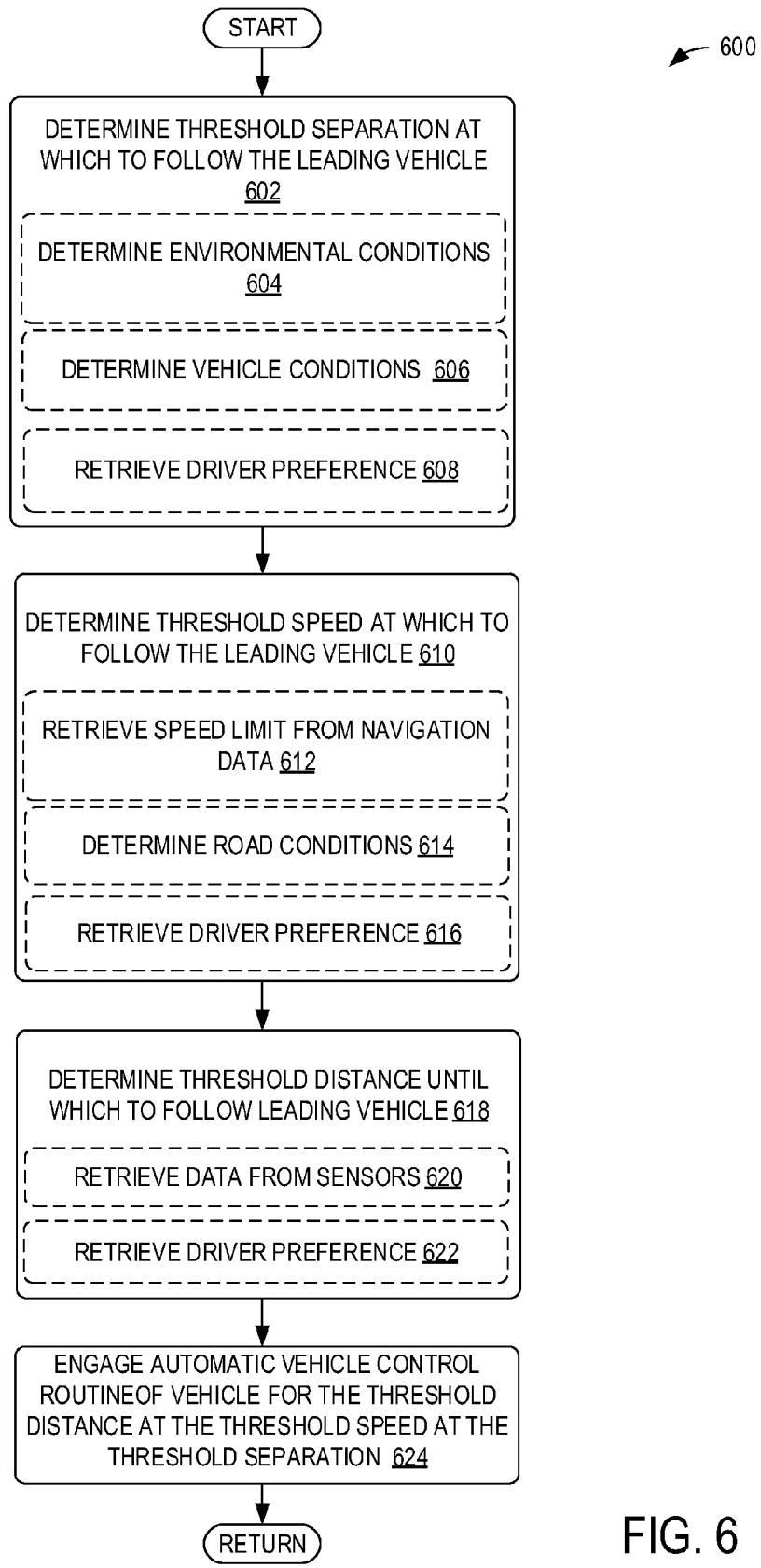
FIG. 6 is a flow chart of an example method for determining a threshold separation, a threshold speed, and a threshold distance to follow the leading vehicle in accordance with one or more embodiments of the present disclosure.

FIG. 6 an example method 600 for determining a threshold separation, a threshold speed, and a threshold distance (e.g., total travelling distance) to follow the leading vehicle. For example, method 600 may be performed by the navigation system 300 illustrated in FIG. 3.

At 602, the method includes determining a threshold separation (or space cushion) at which to follow the leading vehicle. The threshold separation may be defined as the distance at which the trailing vehicle follows the leading vehicle (e.g., the distance between the trailing vehicle and the leading vehicle). In some examples, the threshold separation may include the distance at which the leading vehicle desires to be followed by a trailing vehicle (e.g., according to a user preference and/or vehicle system setting). The threshold separation may be based on environmental conditions determined at 604. For example, during rain or snow, the vehicle traction may be reduced, and the threshold separation may be increased to take this into account. The threshold separation may be further adjusted based on the type of road (construction zone, for example) condition of the road (slippery road, gravel road, for example), bends and curves on road, visibility, inclement weather, heavy traffic, night-time driving, vehicle speed etc.

The separation may additionally or alternatively be based on vehicle conditions determined at 606 and/or driver preference (as retrieved at 608). In poor driving conditions such as heavy rain or snow, the vehicle traction may play a key role in the vehicle control. Depending on the condition of the tires, brakes, presence or absence of traction control system and electronic stability control, and/or other factors, the threshold separation may be further adjusted. For example, if the vehicle has good set of tires with newer threads, then the threshold separation may not be increased, however, if the tire threads are relatively shallow and worn out, and then the threshold separation may be increased at 606. The threshold separation may be reduced if the brakes in the vehicle have poor braking performance.

As described above, the threshold separation may additionally or alternatively be adjusted based on driver preference. For example, the navigation system of the trailing vehicle may determine the space cushion to be 100 ft, but the driver of the trailing vehicle may consider such a space cushion to be too close for his preference. Based on the driver's preference (e.g., as set and stored in vehicle memory and/or as indicated by the driver on the fly at the time of space cushion calculation and/or during initialization or operation of the automatic vehicle control routine), the threshold separation may be increased to 150 ft, for example.

Next, at 610 a threshold speed at which to follow the leading vehicle is determined. The threshold speed may be further adjusted based on the speed limit information retrieved from navigation data, for example, as determined at 612. The navigation data may include information about the speed limit for the roads traveled. For example, the threshold speed may be set to the speed limit. The threshold speed may then be further adjusted based on one or more road conditions determined at 614, and/or driver preference determined at 616. In addition, the threshold speed may be further adjusted based on the speed of the leading vehicle.

Next, the method proceeds to 618, where the threshold distance (e.g., total travelling distance) for following the leading vehicle is determined (e.g., based on a stored setting in memory). The threshold distance may be further adjusted based on one or more of data retrieved from sensors (at 620) and driver preference retrieved at 622. The data received from sensors may include information that the leading vehicle has taken a turn, and is no longer in the path directly in front of the trailing vehicle, for example. Furthermore, the data from the sensors may include navigational information indicating an end of a no-pass zone, construction zone, etc. For example, the distance until which to follow the leading vehicle may depend on the end of a no-pass zone. In some examples, the driver may set a threshold distance for following the leading vehicle, which in some cases may be less than the determined distance to the end of the no-pass zone. In some examples, the driver may wish to continue the automatic trailing of the leading vehicle even when the no-pass zone has ended, in which case the threshold distance may be longer than the length of the no-pass zone. The threshold distance for following the leading vehicle may be expressed as a travelling distance (e.g., length of the road/travel), an amount of time, an exit condition, and/or a location at which to stop following the leading vehicle (e.g., a landmark, intersection, GPS coordinates, etc.).

Finally, the method proceeds to 624 where autopilot and/or automatic vehicle control routine of the trailing vehicle is engaged/operated for the threshold distance at the threshold speed and with threshold separation (space cushion) maintained between the leading vehicle and the trailing vehicle. The technical effect of allowing the trailing vehicle to follow the leading vehicle during certain conditions, and allowing the driver to go "hands-free", is that the driver may be able to get some rest, and thus when the driver resumes manual control of the vehicle, he may be more alert. In this way, the alertness of the driver and overall safety in operating the vehicle may be increased relative to vehicle operation without the disclosed selective automatic vehicle control routine operation.

By performing method 600 via the navigation system of the vehicle, the driver may have the option to stop following the leading vehicle at any point. When the driver wishes to stop following the leading vehicle, the automatic vehicle control routine may be disengaged, and manual control of the vehicle may be initiated. In some example embodiments, the navigation system of the trailing vehicle may communicate with the navigation system of the leading vehicle via vehicle-to-vehicle communication routines, and be able to negotiate and determine the space cushion between the leading and the trailing vehicle.

Figure 7:
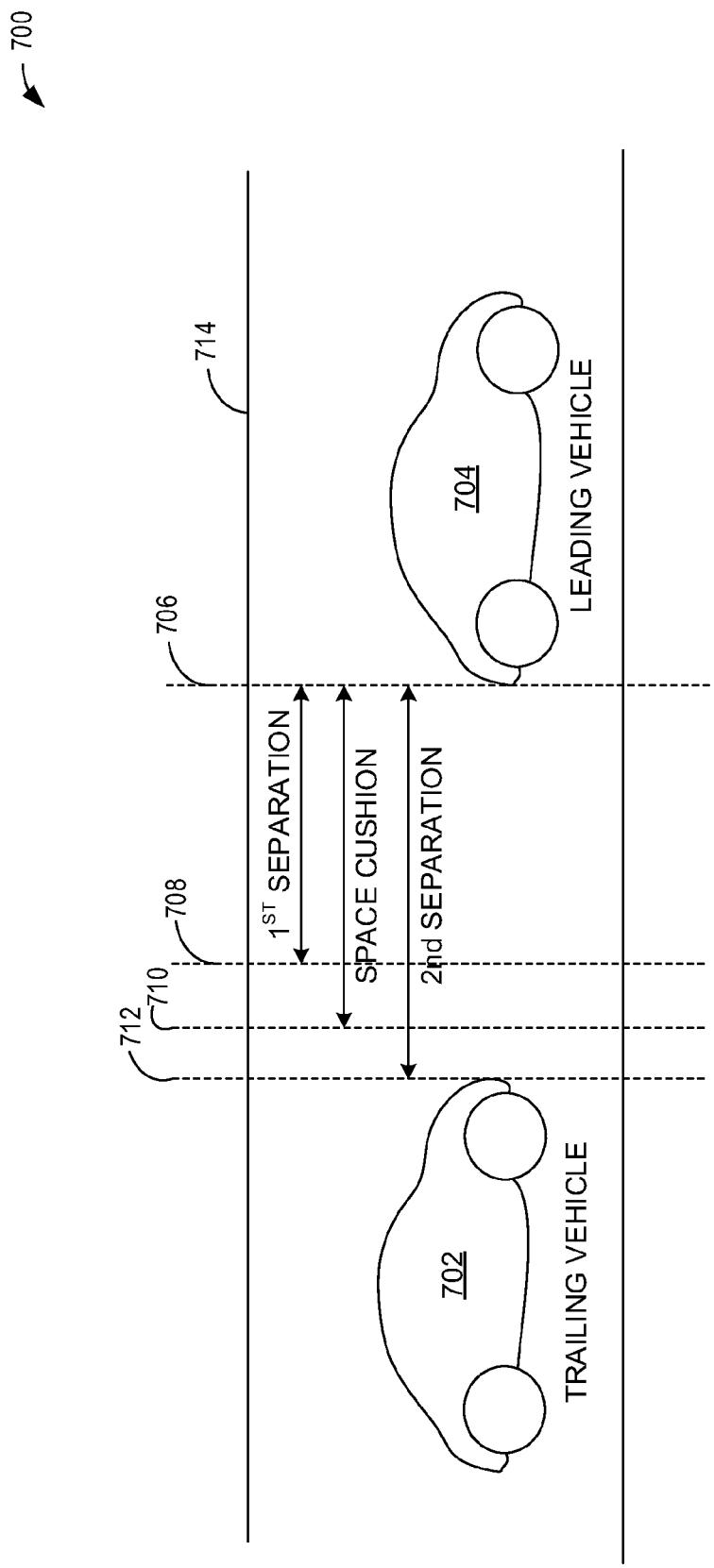
FIG. 7 shows a pictorial illustration of a leading vehicle and a trailing vehicle separated by a distance determined as a space cushion in accordance with one or more embodiments of the present disclosure.

FIG. 7 shows a pictorial illustration 700 of the leading vehicle and the trailing vehicle separated by a distance determined as a space cushion in accordance with one or more embodiments of the present disclosure. In the illustration 700, 702 refers to the trailing vehicle and 704 refers to leading vehicle, wherein the leading vehicle is the vehicle immediately ahead of the trailing vehicle with no other vehicle there between. Both the leading vehicle 704 and the trailing vehicle 702 are travelling along a road 714. As such, the road 714, may include a single lane of a multi-lane roadway or highway, wherein the leading vehicle 704 and the trailing vehicle 702 occupy the same lane of the multi-lane roadway. The road 714 may include a single-lane road. The road 714 may further include one or more of a no-pass zone, a one-lane zone, a construction/road-work ahead zone, and a slippery road. In some examples, the driver of the trailing vehicle may prefer to follow the leading vehicle in order to get some rest. The navigation system of the trailing vehicle may determine a $1^{st}$ separation, represented by the distance between points 706 (e.g., a trailing edge/rear bumper of the leading vehicle) and 708 of the road 714, based on one or more inputs as described earlier. Briefly, the navigation system of the trailing vehicle may determine the $1^{st}$ separation based on one or more of environmental conditions, vehicle conditions, driver preference, etc. The $1^{st}$ separation may be further adjusted based on the speed of the leading and the trailing vehicles, speed limit, driver preference, etc. Upon determining the $1^{st}$ separation, the navigation system of the trailing vehicle may communicate the $1^{st}$ separation to the navigation system of the leading vehicle (via inter-vehicle communication system 312 of FIG. 3, for example). Furthermore, the leading vehicle may compute a second separation at which it would prefer to be followed. The $2^{nd}$ separation, represented as the distance between points 706 and 712 (e.g., the leading edge/front bumper of the trailing vehicle) on the road 714, may further be based on similar conditions as explained with reference to the determination of the $1^{st}$ separation. The navigation system of the leading vehicle may communicate the $2^{nd}$ separation to the navigation system of the trailing vehicle. As such, the $1^{st}$ separation and the $2^{nd}$ separation may be the same or may be different in some examples. If the $1^{st}$ separation is the same as the $2^{nd}$ separation, then the space cushion between the two vehicles may be set at the $1^{st}$ (also the $2^{nd}$) separation. However, if the $1^{st}$ separation is different from the $2^{nd}$ separation, then the space cushion (represented as the distance between the points 706 and 710) may be determined based on one or more of an average of the $1^{st}$ and $2^{nd}$ separation, and a weighted average of the $1^{st}$ and the $2^{nd}$ separation. For example, the weights may be based on driver preference, and further based on whether the vehicle is the leading or the trailing vehicle. In some examples, larger weights may be assigned to the leading vehicle. In additional or alternative examples, one of the leading vehicle and the trailing vehicle may override the opposing vehicle's separation request, or the largest separation request may be used for the space cushion. The space cushion may be determined in one or more of the navigation system of the trailing vehicle and the leading vehicle, and communicated to the respective leading/trailing vehicles.

If one or more drivers of the leading vehicle and the trailing vehicle are not satisfied with the space cushion, there may be a negotiation between the two navigation systems to further adjust the space cushion. In some examples, the trailing vehicle may only be allowed to follow the leading vehicle automatically once both drivers are satisfied and/or approve a selected/negotiated space cushion. In some examples, if the driver of the leading vehicle believes that the trailing vehicle is too close, at any point during travel, the driver of the leading vehicle may communicate to the trailing vehicle to increase the space cushion. The trailing vehicle may then automatically increase the space cushion or may prompt the driver of the trailing vehicle to make a decision on whether to increase the space cushion or stop automatically following the lead vehicle. As such, the communication between the vehicles may be accomplished via vehicle-to-vehicle communication systems. In some examples, the leading vehicle may notice an emergency vehicle, road condition, or other environmental feature ahead and may transmit this information to the trailing vehicle. Responsive to the receipt of the forward perspective information from the leading vehicle, the trailing vehicle may adjust a space cushion, end/reduce an automatic vehicle control routine, and/or prompt the driver of the trailing vehicle to confirm the space cushion and/or ending/adjustment to the automatic control routine. In this way, vehicle and road safety may be enhanced by utilizing the additional perspective provided by the leading vehicle. For example, rear-end collisions may be avoided if the trailing vehicle is made aware of conditions that may cause the leading vehicle to come to an abrupt stop.

Figure 8:
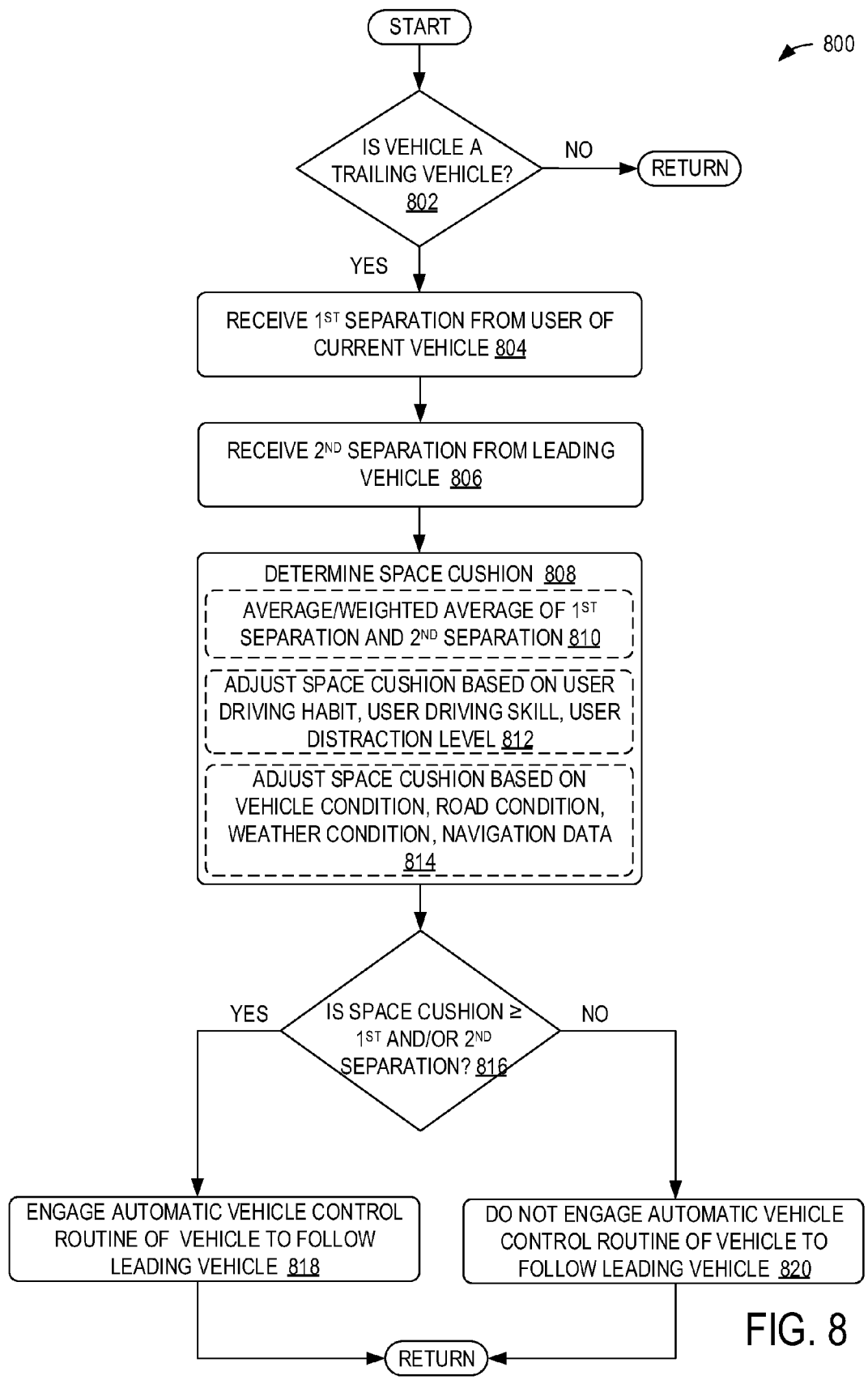
FIG. 8 is a flow chart of an example method for determining a space cushion between the leading vehicle and the trailing vehicle in accordance with one or more embodiments of the present disclosure.

FIG. 8 shows an example method 800 for determining the space cushion between a leading vehicle and a trailing vehicle based on various parameters and preferences. Method 800 may be performed in a trailing vehicle, such as a navigation system and/or an in-vehicle computing system of trailing vehicle 702 of FIG. 7 that requests to follow a leading vehicle, such as leading vehicle 704 of FIG. 7. At 802, the method includes determining if the current vehicle is a trailing vehicle. If the vehicle is not a trailing vehicle, then method returns without determining a space cushion. As described herein, method 800 relates to determining a space cushion in the trailing vehicle. An example method for determining a space cushion in the leading vehicle is described below with respect to FIG. 9. If the vehicle is a trailing vehicle (e.g., "YES" at 802), then the method proceeds to 804 where a first separation is received from the current vehicle (e.g., the trailing vehicle). For example, an indication of a value of the first separation (e.g., a distance that the current vehicle is to maintain from the leading vehicle) may be stored in a storage device local to and/or accessible from the current vehicle (e.g., based on a default setting, a last-used setting, a user preference, etc.). Next, at 806, a second separation is received from the leading vehicle. The first separation is the separation at which the trailing vehicle requests to follow the leading vehicle, while the second separation is the distance at which the leading vehicle requests to be followed. Based on the first separation and the second separation, a space cushion is determined (e.g., as described above with respect to FIGS. 6 and 7) at 808. In some examples, the space cushion is determined to be and/or based on the average or weighted average of the first separation and the second separation as determined at 810. The space cushion may be further adjusted based on a user driving habit, a user driving skill, and a user distraction level as determined at 812. The space cushion may still further adjusted based on one or more of a vehicle condition, road condition, weather condition, and navigation data as indicated at 814. Once the space cushion is determined, then method proceeds to 816, where the space cushion is compared to the first and/or second separation to determine if the space cushion greater than or equal to one or more of the first separation and the second separation. In some examples, the space cushion is compared to the separations to determine whether the space cushion exceeds or equals both the $1^{st}$ and the $2^{nd}$ separations in order to err on the side of following at a safer distance (e.g., where a larger space cushion is safer than a smaller space cushion). In other examples, the space cushion is compared to the separations to determine whether the minimum requested separation condition is met (e.g., whether the space cushion is greater than or equal to either the first or the second separation). In this case, each separation may be assumed to represent a safe following distance, and a space cushion that satisfies at least one of the requested separation distances may be acceptable for use.

If the space cushion is greater than or equal to the $1^{st}$ and/or $2^{nd}$ separation (e.g., "YES" at 816), then the method proceeds to 818 where autopilot and/or automatic vehicle control routine of the trailing vehicle is engaged to follow the leading vehicle while maintaining a separation matching (e.g., substantially equal to) the space cushion (e.g., as determined at 808) between the leading vehicle and the trailing vehicle. However, if the space cushion as determined at 808 is less than one or more of the first separation and the second separation, then the method proceeds to 820, where the autopilot and/or automatic vehicle control of the trailing vehicle is not engaged (e.g., a manual vehicle control is engaged and/or the vehicle operates under a greater amount of manual control than at 818). In some examples, the space cushion may be renegotiated between the trailing vehicle and the leading vehicle to determine a new space cushion if the space cushion is less than each of the first and the second separations. The trailing and/or leading vehicle may request a different separation and method 800 may be repeated with the new separation(s) to determine if a newly calculated space cushion is acceptable to both the leading vehicle and the trailing vehicle (e.g., if the newly calculated space cushion is greater than or equal to the updated requested separation from each vehicle).

Figure 9:
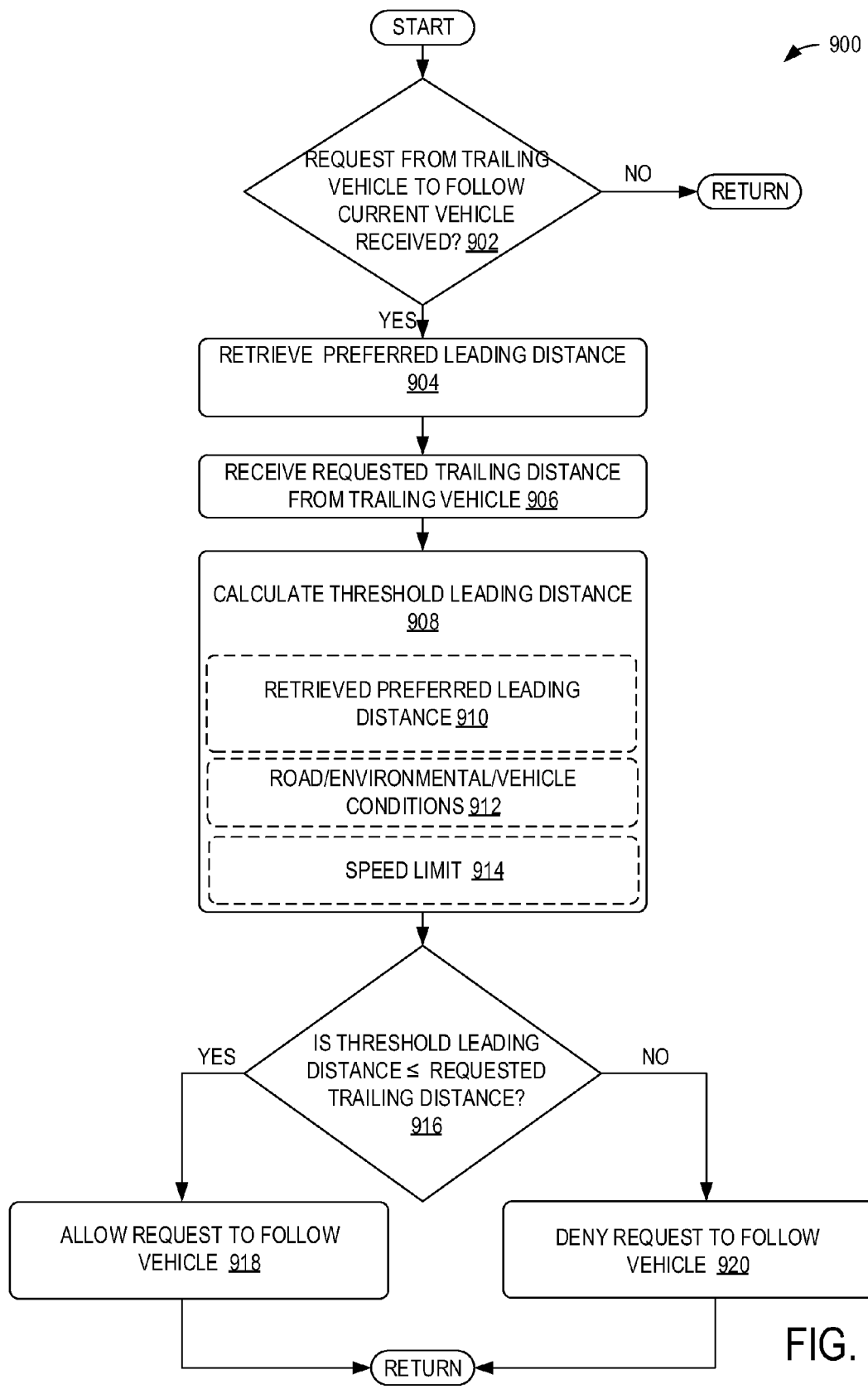
FIG. 9 is a flow chart of an example method for allowing or denying a request to follow a leading vehicle from a trailing vehicle, in accordance with one or more embodiments of the present disclosure.

FIG. 9 shows an example method 900 for allowing or denying a request to follow a leading vehicle from a trailing vehicle, in accordance with one or more embodiments of the present disclosure. Method 900 may be executed in a leading vehicle, such as a navigation system and/or in-vehicle computing system of leading vehicle 704 in FIG. 7, based on a request received from a trailing vehicle, such as trailing vehicle 702. At 902, the method includes determining if a request is received from a trailing vehicle to follow the current (e.g., leading) vehicle. If a request to follow is not received from the trailing vehicle, then the method returns without negotiating a following distance.

If a request to follow the leading vehicle is received from a trailing vehicle (e.g., "YES" at 902), then method proceeds to 904, where a preferred leading distance is retrieved from the memory of the leading vehicle. For example, the driver may input a preference at which the driver prefers to lead another vehicle, as well as a preference at which the driver prefers to follow another vehicle. In some examples, the preferences for leading and following may be the same, but in some examples, the leading distance preference may be greater than the trailing distance preference or vice versa. Next, at 906, the method includes receiving a requested trailing distance from the trailing vehicle. The method then proceeds to 908 where a threshold leading distance is calculated based on one or more of the retrieved preferred leading distance (indicated at 910, e.g., the preferred leading distance retrieved at 904), road/vehicle/environmental conditions as determined at 912, a speed limit as determined at 914, and/or any other suitable parameter(s).

Next, the method proceeds to 916, to determine if the threshold leading distance is less than or equal to the desired trailing distance. If "YES", then method proceeds to 918, where the request to trail the leading vehicle at the desired trailing distance is allowed. However, it the method returns "NO" at 916, then method proceeds to 920, where the request to follow the leading vehicle from the trailing vehicle is denied. If the request to follow the vehicle is approved at 918, the approval may be transmitted from the leading vehicle to the trailing vehicle and/or no rejection communication may be sent to the trailing vehicle in order to allow the trailing vehicle to enable an automatic vehicle control routine and follow the leading vehicle at the requested trailing distance. Conversely, if the request to follow the vehicle is denied at 920, the denial may be transmitted from the leading vehicle to the trailing vehicle and/or no allowance communication may be sent to the trailing vehicle in order to prevent the trailing vehicle from entering an automatic vehicle control routine. In this way, the leading vehicle may accept or deny requests from the trailing vehicle to follow the leading vehicle. The technical effect of establishing communication between the leading vehicle and trailing vehicle is that the leading vehicle can then relay information about accidents ahead for example, and request the trailing vehicle to readjust the space cushion or stop following the leading vehicle altogether. In this way, vehicle and road safety may be enhanced.

The systems and methods described above also provide for a driver assistance system for a vehicle comprising a sensor module communicatively coupled to one or more sensors, a processor, and a storage device storing instructions executable by the processor to responsive to detecting an entry condition, decrease an amount of control of the vehicle provided by a driver of the vehicle, increase an amount of control of the vehicle automatically provided by one or more vehicle systems upon detecting a leading vehicle in front of the vehicle, and automatically control the vehicle to follow the leading vehicle at a threshold separation until detecting an exit condition. In a first example of the driver assistance system, the system may additionally or alternatively include decreasing the amount of control of the vehicle provided by the driver of the vehicle comprises disengaging a manual vehicle control routine and increasing the amount of control of the vehicle automatically provided by one or more vehicle systems comprises engaging an automatic vehicle control routine, and wherein the storage device includes further instructions executable by the processor to responsive to detecting the exit condition, disengage the automatic vehicle control routine, and re-engage the manual vehicle control routine. A second example of the driver assistance system optionally includes the first example, and further includes wherein the entry condition includes identifying start of a no-passing zone further based on inputs from the sensors, the sensors including one or more of cameras mounted on the vehicle and wherein the entry condition is further based on a driver preference. A third example of the driver assistance system optionally includes one or more of the first and the second examples, and further includes wherein the entry condition includes identifying start of one or more of a narrow lane zone, a one-lane zone, a construction/road-work ahead zone, and a slippery road, further based on the inputs from the sensors and wherein the entry condition is further based on the driver preference. A fourth example of the driver assistance system optionally includes one or more of the first through the third examples, and further includes wherein the exit condition includes identifying an end of one or more of the no-passing zone and wherein the exit condition is further based on the driver preference. A fifth example of the driver assistance system optionally includes one or more of the first through the fourth examples, and further includes wherein the exit condition includes identifying an end of one or more of the narrow lane zone, the one-lane zone, the construction/road-work ahead zone, and the slippery road, and wherein the exit condition is further based on the driver preference. A sixth example of the driver assistance system optionally includes one or more of the first through the fifth examples, and further includes wherein one or more of the entry condition and the exit condition is detected based on identifying, via images captured by one or more cameras, audio detected by one or more microphones, and/or navigation data from a navigation unit, one or more of lane markings, road signs, road geography, traffic patterns, vehicle conditions, and user input. A seventh example of the driver assistance system optionally includes one or more of the first through the sixth examples, and further includes wherein engaging the automatic vehicle control routine includes automatically controlling an engine control system of the vehicle to automatically follow the leading vehicle at a threshold speed and threshold separation and for a threshold time, disengaging the automatic vehicle control routine includes ceasing the automatic controlling of the engine control system and returning control of the engine control system to the driver. A eighth example of the driver assistance system optionally includes one or more of the first through the seventh examples, and further includes wherein the threshold speed, the threshold time, and the threshold separation are further based on one or more of the entry condition, a vehicle condition, the driver preference, the exit condition, and a road condition.

The systems and methods described above also provide for a navigation system for a vehicle, comprising a sensor subsystem communicatively coupled to one or more sensors mounted on the vehicle and/or positioned along a travelling road, an inter-vehicle communication system configured to receive and transmit information between the vehicle and a leading vehicle; a global positioning system (GPS), a processor, and a storage device storing user preferences and storing instructions executable by the processor to detect an upcoming no-pass zone based on sensor data from the sensors, and send instruction to a vehicle control system of the vehicle to activate automatic vehicle control routine to trail the leading vehicle based on the user preferences, wherein the automatic vehicle control routine includes automatically controlling movement of the vehicle with reduced driver intervention relative to driver intervention while operating the vehicle using a manual vehicle control routine. In a first example of the navigation system, the system may additionally or alternatively include wherein the user preferences includes one or more of an authorization to follow the leading vehicle, an amount of separation to maintain between the vehicle and the leading vehicle, and a maximum travelling distance to follow the leading vehicle. A second example of the navigation system optionally includes the first example, and further includes wherein the user preferences are further determined based on user historical data. A third example of the navigation system optionally includes one or more of the first and the second examples, and further includes wherein upon activating the automatic vehicle control routine, the maximum travelling distance to follow the leading vehicle is further adjusted based on a length of a no-pass zone wherein the length of the no-pass zone is further determined based on information from one or more of the sensor subsystem, the GPS, and the user preferences. A fourth example of the navigation system optionally includes one or more of the first through the third examples, and further includes wherein the instructions are further executable to transmit, via the inter-vehicle communication system, the authorization to follow the leading vehicle to a vehicle communication system of the leading vehicle, receive, via the inter-vehicle communication system, feedback from a vehicle communication system of the leading vehicle, and, responsive to receiving no-follow feedback from the leading vehicle, not activate the automatic vehicle control routine. A fifth example of the navigation system optionally includes one or more of the first through the fourth examples, and further includes wherein detecting the upcoming no-pass zone is based on data from one of more of a navigation database, the GPS, and image data including road signs obtained via one or more cameras in communication with the navigation system. A sixth example of the navigation system optionally includes one or more of the first through the fifth examples, and further includes wherein the vehicle control system determines a maximum speed and a maximum travelling distance to follow the leading vehicle based on one or more environmental conditions and vehicle conditions. A seventh example of the navigation system optionally includes one or more of the first through the sixth examples, and further includes wherein the instructions are further executable to deactivate the automatic vehicle control routine upon termination of the no-pass zone and present an instruction to the driver to take control of the vehicle.

The systems and methods described above also provide for a method for a navigation system of a vehicle, the method comprising responsive to detecting a no-pass zone of a roadway and receiving an authorization from a driver to trail a leading vehicle, issuing vehicle control command from the navigation system to a vehicle control system to control engine operation of the vehicle. In a first example of the method, the method may additionally or alternatively include wherein the vehicle control command instructs the vehicle control system to engage autopilot of the vehicle and further disengages driver control of the vehicle via one or more driver-initiated vehicle control commands to one or more driver control devices in the vehicle. A second example of the method optionally includes the first example, and further includes wherein the vehicle control command further includes instructions regarding one or more of a speed at which to follow the leading vehicle, a distance for which to follow the leading vehicle and a separation at which to follow the leading vehicle, and wherein the speed, the distance, and the separation are further adjusted based on one or more of a driver input, environmental conditions, and vehicle conditions.

The systems and methods described above also provide for a vehicle-to-vehicle communication system of a first vehicle, the system comprising a user input interface configured to receive an input from a user, an inter-vehicle communication system capable of communicating with a navigation system of a second vehicle, a processor, and a storage device storing instructions executable by the processor to receive a first separation from the user of the first vehicle, the first separation being input via the user input interface, and responsive to receiving a first separation from the user of the first vehicle, determine a space cushion between the second vehicle and the first vehicle, the space cushion is determined based on one more of the first separation, and a second separation communicated from the second vehicle via the inter-vehicle communication system, and adjust a distance between the first vehicle and the second vehicle based on the space cushion. In a first example of the vehicle-to-vehicle communication system, the system may additionally or alternatively include wherein the first vehicle is a trailing vehicle and wherein the second vehicle is a leading vehicle immediately ahead of the trailing vehicle with no vehicle there between. A second example of vehicle-to-vehicle communication system optionally includes the first example, and further includes wherein the space cushion is one or more of an average of the first and the second separation, and a weighted average of the first and the second separation. A second example of the vehicle-to-vehicle communication system optionally includes the first example, and further includes wherein the instructions are further executable to adjust the space cushion based on user driving habit, user driving skill, and user distraction level of one or more of a driver of the first vehicle and a driver of the second vehicle. A third example of the vehicle-to-vehicle communication system optionally includes one or more of the first and the second example, and further includes wherein the space cushion is further adjusted based on a vehicle condition, a road condition, and a weather condition, wherein the vehicle condition includes a vehicle condition of one or more of the first vehicle and the second vehicle, and wherein the space cushion is further adjusted based on navigational data. A fourth example of the vehicle-to-vehicle communication system optionally includes one or more of the first through the third example, and further includes wherein the instructions are further executable to responsive to determining the space cushion is lower than one or more of the first separation and the second separation, engage an automatic vehicle control routine of the first vehicle to automatically follow the second vehicle at a distance determined as the space cushion, and decrease an amount of control of the first vehicle by the driver of the first vehicle. A fifth example of the vehicle-to-vehicle communication system optionally includes one or more of the first through the fourth example, and further includes wherein the instructions are further executable to disengage the automatic vehicle control routine of the first vehicle based on a request from one or more of the first vehicle and the second vehicle and readjust the space cushion between the first vehicle and second vehicle based on user preference of one or more of the driver of the first vehicle and the driver of the second vehicle. A sixth example of the vehicle-to-vehicle communication system optionally includes one or more of the first through the fifth example, and further includes wherein the instructions are further executable to responsive to determining the space cushion is higher than one or more of the first separation and the second separation, deactivate the automatic vehicle control routine of the first vehicle and increase the amount of control of the first vehicle by the driver of the first vehicle.

The systems and methods described above also provide for a navigation system of a vehicle, comprising a sensor system communicatively coupled to cameras mounted on the vehicle, an inter-vehicle communication system configured to receive and transmit information from the vehicle to a leading vehicle, a processor, and a storage device storing user preferences and storing instructions executable by the processor to responsive to determining the vehicle to be a trailing vehicle, the trailing vehicle being positioned immediately behind the leading vehicle with no vehicle there between, retrieving a desired separation at which to follow the leading vehicle, determine a space cushion based on one or more of the desired separation and other parameters, and follow the leading vehicle at a final distance, the final distance being the space cushion. In a first example of the navigation system, the system may additionally or alternatively include determining the vehicle to be the trailing vehicle is based on input from one or more of the global positioning system, the sensor system and a user input. A second example of the navigation system optionally includes the first example, and further includes wherein the desired separation is a user preference input by the user. A third example of the navigation system optionally includes one or more of the first and the second example, and further includes wherein the other parameters include on one or more of a feedback from the leading vehicle, an environmental condition, a road condition, and a vehicle condition. A fourth example of the navigation system optionally includes one or more of the first through the third examples, and further includes wherein the instructions are further executable to, responsive to determining the vehicle to be a leading vehicle, retrieve a preferred separation to be followed, determine a space cushion based on one or more of the preferred separation and one or more other parameters, and lead the trailing vehicle at a final distance, the final distance being the space cushion. A fifth example of the navigation system optionally includes one or more of the first through the fourth examples, and further includes wherein determining the vehicle to be the leading vehicle is based on input from one or more of the global positioning system, the sensor system and a user input. A sixth example of the navigation system optionally includes one or more of the first through the fifth examples, and further includes wherein the preferred separation is a user preference input by the user. A seventh example of the navigation system optionally includes one or more of the first through the sixth examples, and further includes wherein the one or more other parameters include one or more of a feedback from the trailing vehicle, an environmental condition, a road condition, and a vehicle condition.

The systems and methods described above also provide for a method for a navigation system of a leading vehicle, the method comprising receiving, from a trailing vehicle, a request to automatically follow the vehicle; and responsive to receiving the request, retrieve a preferred leading distance from a storage device of a navigation system and selectively adjust the preferred leading distance based upon one or more vehicle and/or environmental conditions. In a first example of the method, the method may additionally or alternatively include calculating a threshold leading distance based on one or more of the preferred leading distance, road conditions, environmental conditions, vehicle conditions, and a speed limit. A second example of the method optionally includes the first example, and further includes accepting the request to follow the vehicle if a desired trailing distance received from the trailing vehicle is higher than the threshold leading distance. A third example of the method optionally includes one or more of the first and the second example, and further includes denying the request to follow the vehicle, if the desired trailing distance received from the trailing vehicle is lower than the threshold leading distance.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 109 described with reference to FIG. 1 and/or in-vehicle computing system 200 described with reference to FIG. 2, in combination with navigation system 300 described with reference to FIG. 3. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A vehicle-to-vehicle communication system of a first vehicle, the system comprising:
    a user input interface configured to receive an input from a user of the first vehicle, the input including a request to follow a second vehicle;
    an inter-vehicle communication system capable of communicating with a navigation system of the second vehicle;
    a processor; and
    a storage device storing instructions executable by the processor to:
        receive a first separation between the first vehicle and the second vehicle from the user of the first vehicle, the first separation being input via the user input interface;
        responsive to receiving a first separation from the user of the first vehicle, determine a space cushion between the second vehicle and the first vehicle, the space cushion is determined based on one more of the first separation, and a second separation between the first vehicle and the second vehicle communicated from the second vehicle via the inter-vehicle communication system; and
        adjust a distance between the first vehicle and the second vehicle based on the space cushion.

2. The vehicle-to-vehicle communication system of claim 1, wherein the first vehicle is a trailing vehicle and wherein the second vehicle is a leading vehicle immediately ahead of the trailing vehicle with no vehicle there between, wherein the space cushion is a first space cushion, and wherein the instructions are further executable to determine if the first space cushion is acceptable to both the leading vehicle and the trailing vehicle and determine a new space cushion if the first space cushion is not acceptable to both the leading vehicle and the trailing vehicle.

3. The vehicle-to-vehicle communication system of claim 2, wherein the space cushion is determined based on both the first separation and the second separation, and wherein the instructions are further executable to adjust the space cushion based on user driving habit, user driving skill, and user distraction level of one or more of a driver of the first vehicle and a driver of the second vehicle.

4. The vehicle-to-vehicle communication system of claim 3, wherein the space cushion is further adjusted based on a vehicle condition, a road condition, and a weather condition, wherein the vehicle condition includes a vehicle condition of one or more of the first vehicle and the second vehicle, and wherein the space cushion is further adjusted based on navigational data.

5. The vehicle-to-vehicle communication system of claim 4, wherein the instructions are further executable to:
    responsive to determining the space cushion is lower than one or more of the first separation and the second separation, engage an automatic vehicle control routine of the first vehicle to automatically follow the second vehicle at a distance determined as the space cushion, and decrease an amount of control of the first vehicle by the driver of the first vehicle.

6. The vehicle-to-vehicle communication system of claim 5, wherein the instructions are further executable to disengage the automatic vehicle control routine of the first vehicle based on a request from one or more of the first vehicle and the second vehicle and readjust the space cushion between the first vehicle and second vehicle based on user preference of one or more of the driver of the first vehicle and the driver of the second vehicle.

7. The vehicle-to-vehicle communication system of claim 5, wherein the instructions are further executable to:
responsive to determining the space cushion is higher than one or more of the first separation and the second separation, deactivate the automatic vehicle control routine of the first vehicle and increase the amount of control of the first vehicle by the driver of the first vehicle.

8. The vehicle-to-vehicle communication system of claim 1, wherein the space cushion is one or more of an average of the first and the second separation, and a weighted average of the first and the second separation, wherein the instructions are executable to prevent the first vehicle from entering an automatic control routine responsive to receiving, from the second vehicle, a denial of the request to follow the second vehicle.

9. A navigation system of a vehicle, comprising:
a sensor system communicatively coupled to cameras mounted on the vehicle;
an inter-vehicle communication system configured to receive and transmit information from the vehicle to a leading vehicle;
a processor; and
a storage device storing user preferences and storing instructions executable by the processor to:
responsive to determining the vehicle to be a trailing vehicle, the trailing vehicle being positioned immediately behind the leading vehicle with no vehicle therebetween, retrieving a desired separation between the trailing vehicle and the leading vehicle, the desired separation being input via a user input interface of the trailing vehicle or received from the leading vehicle via the inter-vehicle communication system,
determine a space cushion between the trailing vehicle and the leading vehicle based on one or more of the desired separation and other parameters, and
follow the leading vehicle at a final distance, the final distance being the space cushion.

10. The navigation system of claim 9, wherein determining the vehicle to be the trailing vehicle is based on input from one or more of a global positioning system, the sensor system, and a user input.

11. The navigation system of claim 9, wherein the desired separation is a user preference input by a user.

12. The navigation system of claim 9, wherein the other parameters include on one or more of a feedback from the leading vehicle, an environmental condition, a road condition, and a vehicle condition.

13. The navigation system of claim 9, wherein the instructions are further executable to, responsive to determining the vehicle to be a leading vehicle, retrieve a preferred separation to be followed,
determine a space cushion based on one or more of the preferred separation and one or more other parameters, and
lead the trailing vehicle at a final distance, the final distance being the space cushion.

14. The navigation system of claim 13, wherein determining the vehicle to be the leading vehicle is based on input from one or more of the global positioning system, the sensor system, and a user input.

15. The navigation system of claim 13, wherein the preferred separation is a user preference input by a user.

16. The navigation system of claim 13, wherein the one or more other parameters include one or more of a feedback from the trailing vehicle, an environmental condition, a road condition, and a vehicle condition.

17. A method for a navigation system of a leading vehicle, the method comprising:
receiving, from a trailing vehicle, a request to automatically follow the vehicle; and
responsive to receiving the request, retrieve, from a storage device of the navigation system, a preferred leading distance from the trailing vehicle to the leading vehicle and selectively adjust the preferred leading distance based upon one or more vehicle and/or environmental conditions.

18. The method of claim 17, further comprising calculating a threshold leading distance based on one or more of the preferred leading distance, road conditions, environmental conditions, vehicle conditions, and a speed limit.

19. The method of claim 18, further comprising accepting the request to follow the vehicle if a desired trailing distance received from the trailing vehicle is higher than the threshold leading distance and transmitting an acceptance of the request to the trailing vehicle.

20. The method of claim 19, further comprising denying the request to follow the vehicle if the desired trailing distance received from the trailing vehicle is lower than the threshold leading distance and transmitting a denial of the request to the trailing vehicle.

* * * * *